United States Patent [19]

Cho

[11] Patent Number: 5,136,380
[45] Date of Patent: Aug. 4, 1992

[54] DISPLAY SIGNAL DEVICE AND METHOD FOR PROVIDING COMPATIBILITY BETWEEN NTSC TELEVISION AND HDTV

[75] Inventor: Hyeon-Deok Cho, Suwon, Rep. of Korea

[73] Assignee: SamSung Electronics Co., Ltd., Suweon, Rep. of Korea

[21] Appl. No.: 634,704

[22] Filed: Dec. 27, 1990

[30] Foreign Application Priority Data

Dec. 28, 1989 [KR] Rep. of Korea ............... 1989-19919

[51] Int. Cl.⁵ ..................... H04N 7/01; H04N 11/20
[52] U.S. Cl. ...................................... 358/141; 358/12
[58] Field of Search .................. 358/11, 12, 140, 141

[56] References Cited

U.S. PATENT DOCUMENTS 4,907,069  3/1990  Bretl ..................................... 358/12
4,931,855  6/1990  Salvadorini ......................... 358/12

Primary Examiner—Howard W. Britton
Attorney, Agent, or Firm—Robert E. Bushnell

[57] ABSTRACT

There is disclosed a device and a circuit to provide compatibility between NTSC television and HDTV by using dual channel transmission system. One embodiment may be arranged with means for generating a first display signal, a pre-filter (13) which prevents aliasing by filtering the first display signal, a first scanning converter (14), a first NTSC encoder (15), a first RF modulator (16), a delay unit (17), a first line rejecter (18), a second scanning converter (19), a first postfilter (20), a second line rejecter (21), a subtractor, a first frequency shifter (23), a signal reconstruction circuit (24), a second NTSC encoder (25), and a second RF modulator (26).

8 Claims, 5 Drawing Sheets

DISPLAY SIGNAL DEVICE AND METHOD FOR PROVIDING COMPATIBILITY BETWEEN NTSC TELEVISION AND HDTV

BACKGROUND OF THE INVENTION

The present invention relates to a High Definition television (hereinafter, referred to as HDTV) system, and more particularly to a device and a method for providing compatibility between NTSC television and HDTV simultaneously by using a dual channel transmission system.

Since the generally adapted National Television System Committee (hereinafter, referred to as NTSC) broadcasting system has a 6 MHz bandwidth for one channel, its enhancement of resolution is greatly limited. And in order to enhance the resolution of television systems, the HDTV system is being proposed. However, even if a new channel band is assigned for the HDTV different from the NTSC broadcasting system, a drawback occurs in that the NTSC broadcast and HDTV broadcasts have to be operated separately since HDTV broadcast cannot be viewed using conventional NTSC television. To solve this drawback, a method has been proposed in which the NTSC signal is transmitted unaltered and the HDTV signal is either multiplexed on the existing NTSC broadcast signal or transmitted via a different channel. Here, the horizontal:vertical aspect ratio of the NTSC broadcast signal is 4:3 while the aspect ratio of the HDTV broadcast is 16:9. To overcome this problem of different aspect ratio composition, a side panel signal processing method and a letter box method have been proposed. In the side panel method, a the HDTV signal is output with the vertical side of the NTSC aspect ratio as the reference, and the image signal of the horizontal side is processed separately as the side panel signal and transmitted. In the letter box method, the HDTV image signal is output with the horizontal side of the NTSC aspect ratio as the reference, and there appears a black area where there is no image signal on the vertical side. Therefore, the side panel signal processing method requires complex processing procedures, and the letter box method has a drawback of poor definition.

SUMMARY OF THE INVENTION

It is accordingly an object of this invention to provide a device and method for compatibility between NTSC format and HDTV format by transmitting HDTV broadcast signals on a dual channel.

It is another object of this invention to provide an encoding device and method for compatibility between NTSC format and the HDTV format by composing an image signal having a higher number of scanning lines than the HDTV format to aspect ratio of the NTSC format, and then for the NTSC channel, transmit the scanning line as 525 lines, and for the HDTV channel transmit the scanning line after rejecting the top and bottom scan lines to match the HDTV format.

It is still another object of this invention to provide a device and method for decoding the HDTV broadcast signal by first converting image signals received on a NTSC channel into an aspect ratio of HDTV format, and then adding the signal with the image signal received on the HDTV channel.

BRIEF DESCRIPTION OF THE DRAWINGS

For a better understanding of the invention and to show how the same may be carried into effect, reference will now be made, by way of example, to the accompanying diagrammatic drawings, in which:

FIG. 6 shows an output of the signal reconstruction circuit in FIG. 2.

DESCRIPTION OF THE PREFERRED EMBODIMENTS

Hereinafter, a detailed description of the invention will be given with reference to the drawings.

Figure 1:
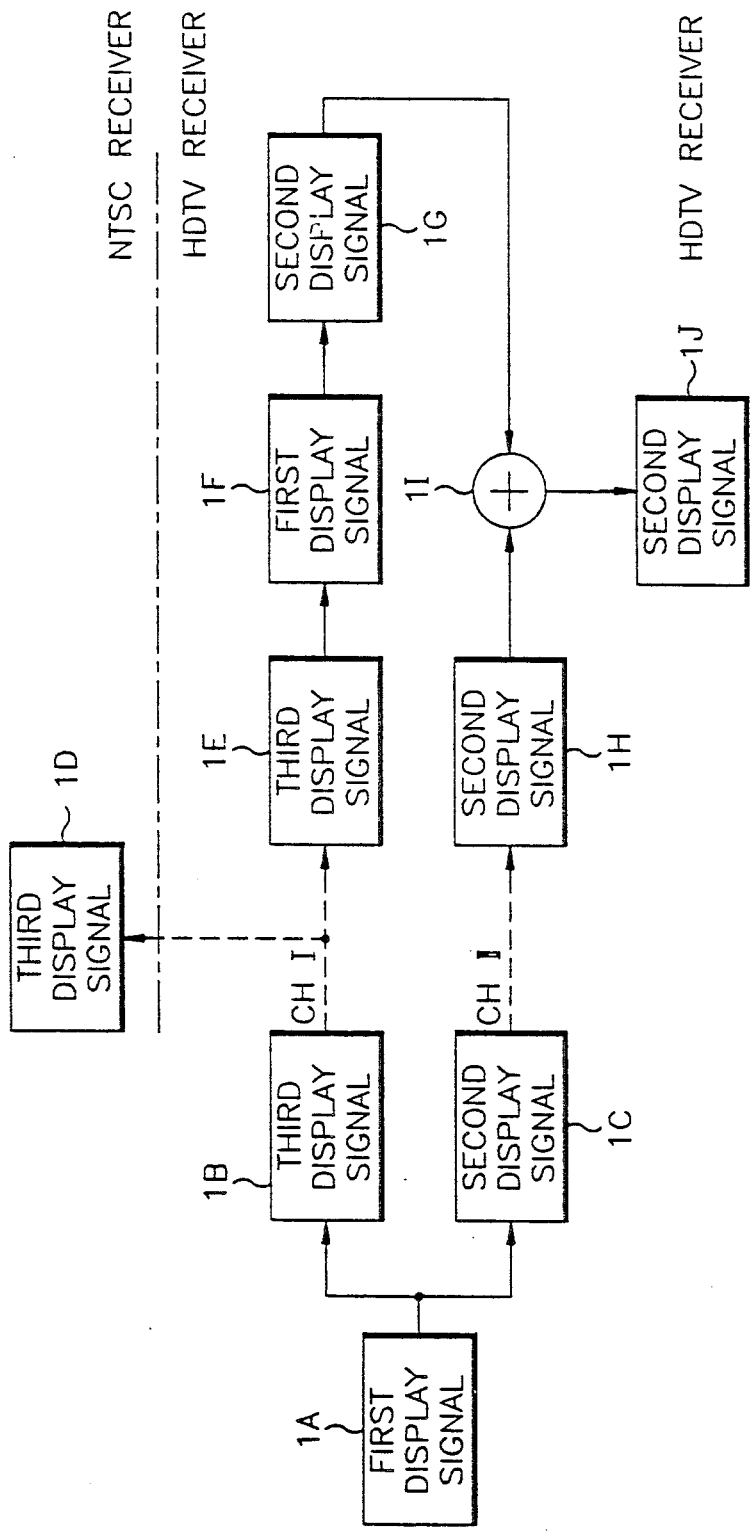
FIG. 1 shows a flowchart of an image encoding and decoding procedure according to the invention.

FIG. 1 is a procedure for processing the horizontal line and aspect ratio of HDTV and NTSC format according to the invention.

Referring to FIG. 1, a first step 1A generates a first display signal of an image signal having 1575 horizontal lines, 2:1 interlaced scanning, and 4:3 aspect ratio. A second step 1B generates a third display signal having 525 horizontal lines, 2:1 interlaced scan, and 4:3 aspect ratio with "high" band of temporal direction component and "low" band of spatial direction component by converting 1575 horizontal lines of the first display signal to $\frac{1}{3}$, and then transmitting the signal via channel one after encoding it in NTSC format. A third step 1C generates a second display signal having 1080 horizontal lines, 2:1 interlaced scanning, 16:9 aspect ratio with "low" band of temporal direction component and "high" band of spatial direction component by rejecting a number of top and bottom horizontal lines from 1575 horizontal lines of the first display signal, and then transmitting the signal via channel two. A fourth step 1E, 1F converts the third display signal of the channel one to the first display signal having 1575 horizontal lines, 2:1 interlaced scan, and 4:3 aspect ratio. A fifth step 1G converts the first display signal to second display signal having 1080 horizontal lines, 2:1 interlaced scanning, and 4:3 aspect ratio by rejecting a number of top and bottom horizontal lines from 1575 horizontal lines of the first display signal. A sixth step 1H compensates and reconstructs the temporal component of the second display signal which is transmitted via channel two. A seventh step 1I compensates low band of the spatial component of the second display signal by adding the two second display signals. An eighth step 1J displays the compensated second display signal.

Figure 2:
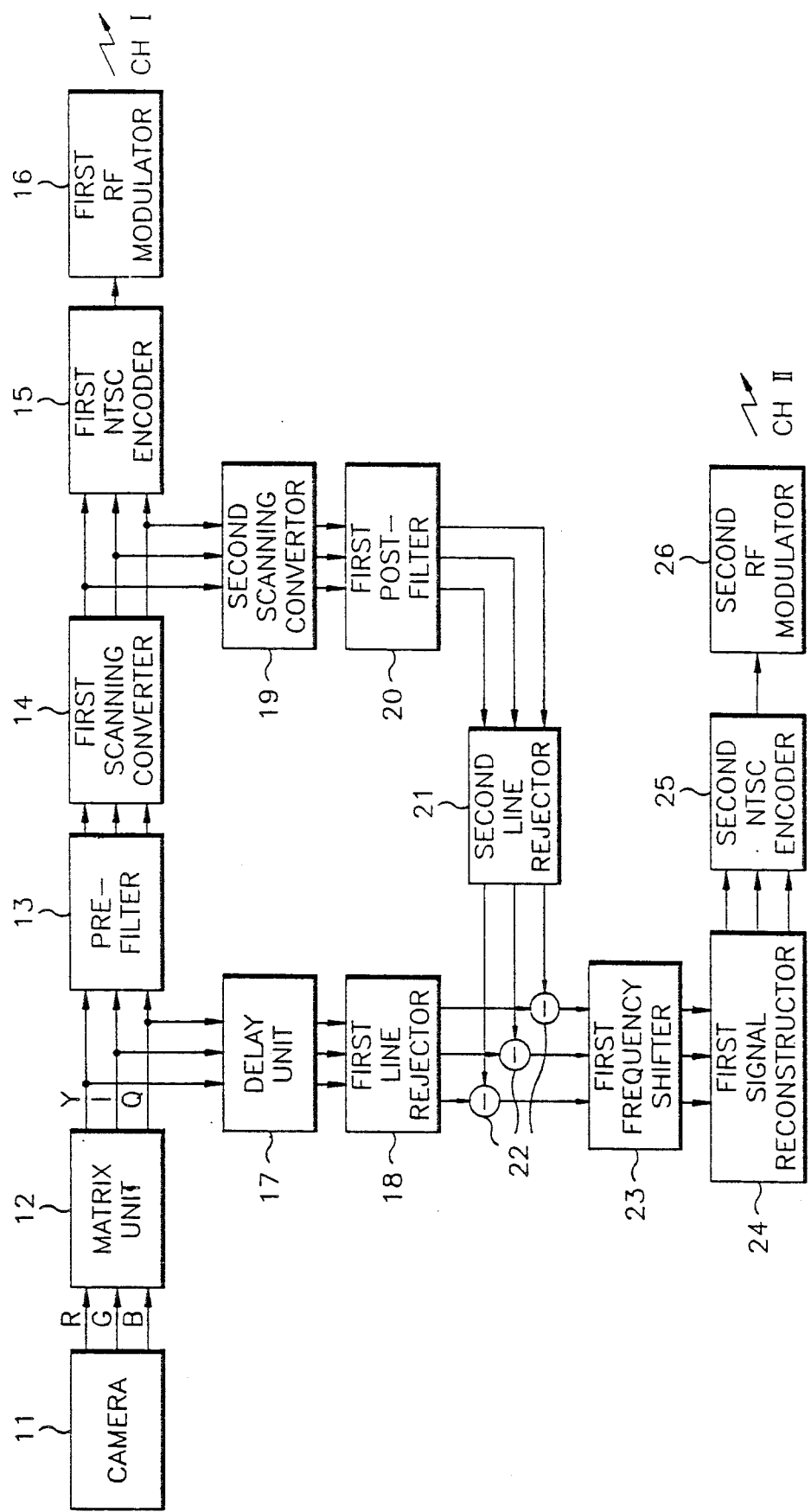
FIG. 2 shows a block diagram of an encoder according to the invention.

Referring to FIG. 2, a camera (11) generates R,G,B signals of the first display signal having 1575 horizontal lines, 2:1 interlaced scanning, and 4:3 aspect ratio. A matrix unit (12) converts the R,G,B, signals to Y,I,Q signals. A pre-filter (13) prevents aliasing by filtering the first display signal output from the matrix (12). A first scanning converter (14) converts the first display signal output of the pre-filter (13) to a third display signal having 525 horizontal lines, 2:1 interlaced scan, and 4:3 aspect ratio with low spatial component. A first NTSC encoder (15) encodes the first display signal output of the first scanning converter (14) as a broadcast signal in NTSC format. A first RF modulator (16) modulates the output of the first NTSC encoder (15) with a RF signal and transmits the signal via channel one. A delay unit (17) delays the first display signal of the matrix (12). A first line rejecter (18) converts the first display signal of the delay unit (17) into a second display signal having 1080 horizontal lines, 2:1 interlaced scanning, and 16:9 aspect ratio by rejecting a number of top and bottom horizontal lines from the first display signal. A second scanning converter (19) converts the third display signal of the first scanning converter (14) to first display signal having 1575 horizontal lines, 2:1 interlaced scanning, and 4:3 aspect ratio. A post-filter (20) prevents aliasing by filtering the first display signal of the second scanning converter (19). A second line rejecter (21) converts the output of the post-filter (20) to second display signal having 1080 horizontal lines, 2:1 interlaced scanning, and 16:9 aspect ratio by rejecting a number of top and bottom horizontal lines from the first display signal. A subtractor (22) removes low band of spatial component of the second display signal by subtracting the output of the second line rejecter (19) from the first line rejecter (18). A first frequency shifter (23) shifts the second display signal of the subtractor (22) for reconstructor. A first signal reconstructior (24) inputs the output of the first frequency shifter (23) and reconstructs one frame into six fields and makes temporal component of the second display signal to low band. A second NTSC encoder (25) encodes the output of the first signal reconstructor (24) to broadcasting signal of NTSC format. A second RF modulator (26) modulates the output of the second NTSC encoder (25) to RF signal and transmits the signal via channel.

Figure 3:
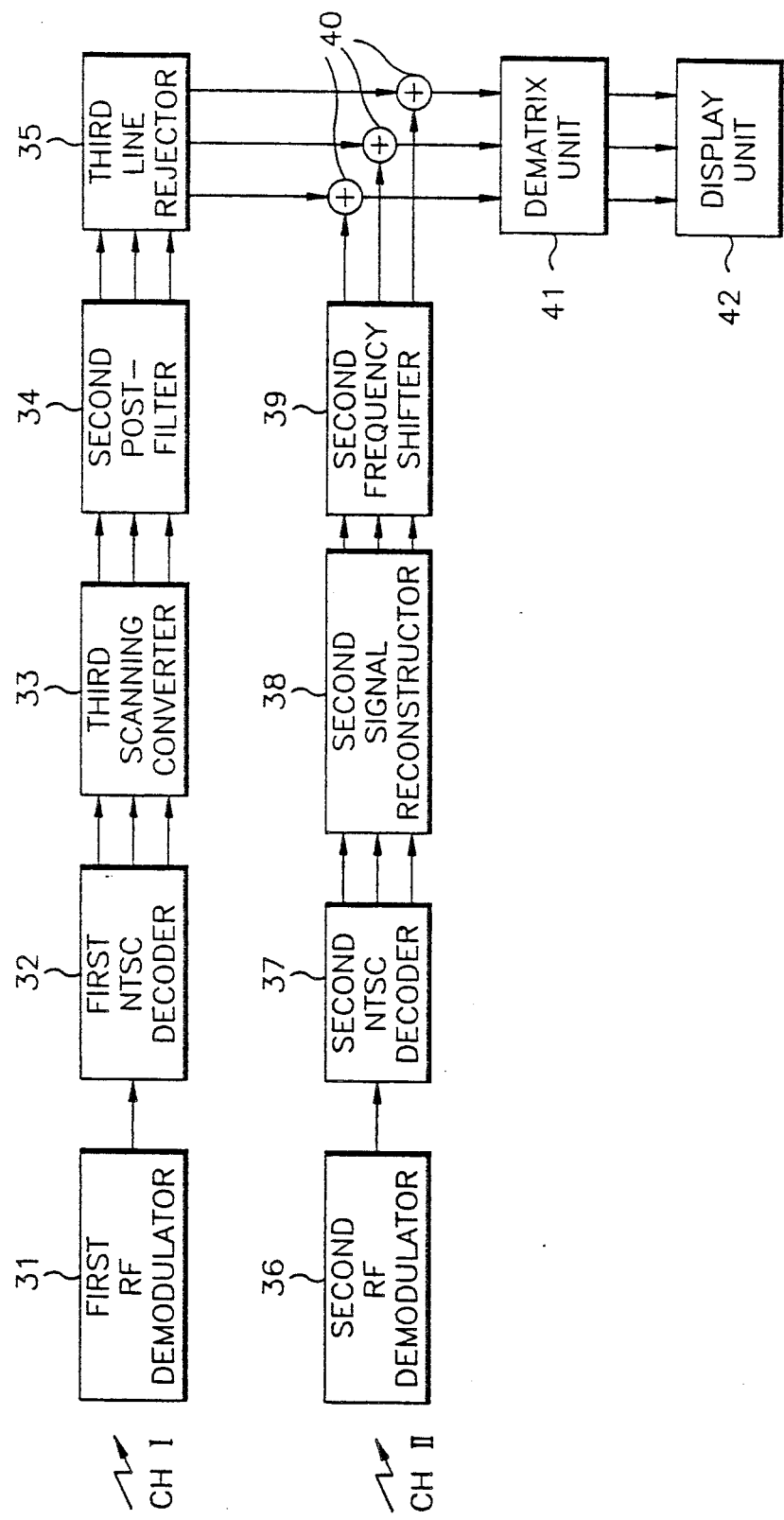
FIG. 3 shows a block diagram of a decoder according to the invention.

Referring to FIG. 3, a first RF demodulator (31) demodulates the third display signal in RF format transmitted via channel one. A first NTSC decoder (32) decodes the output of the first RF demodulator (31) in NTSC format. A third scanning converter (33) converts the output of the first decoder (32) to first display signal having 1575 horizontal lines, 2:1 interlaced prevents aliasing by filtering the output of the third scanning converter (33). A third line rejecter (35) converts the first display signal of the second post-filter (34) to second display signal having 1080 horizontal lines, 2:1 interlaced scanning, and 16:9 aspect ratio by rejecting a number of top and bottom horizontal lines from the first display signal. A second RF demodulator (36) demodulates the second display signal in RF format transmitted via channel two. A second NTSC decoder (37) decodes the output of the second RF demodulator (36) in NTSC format. A signal reconstructor (38) synthesizes even and odd fields from the output of the second decoder (37) and reconstructs 1 frames into 2 fields to compensate the temporal component of the second display signal back to original. A second frequency shifter (30) inputs the output of the second reconstructor (38) and shifts back to original frequency. An adder (40) compensates the low band of the second display signal by adding the second display signals output from the third line rejecter (35) and the second frequency shifter (39). A dematrix unit (41) converts the Y,I,Q signal outputted by the adder (40) to R,G,B signal. A display unit (52) displays the output of the dematrix unit (41).

Figure 4:
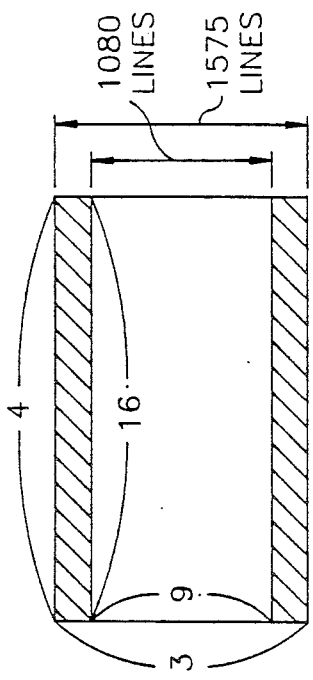
FIG. 4 shows an aspect ratio of HDTV and NTSC format.

FIG. 4 shows an example of a display signal having 1575 horizontal lines, 2:1 interlaced scanning, and 4:3 aspect ratio outputted as HDTV signal.

Figure 5A:
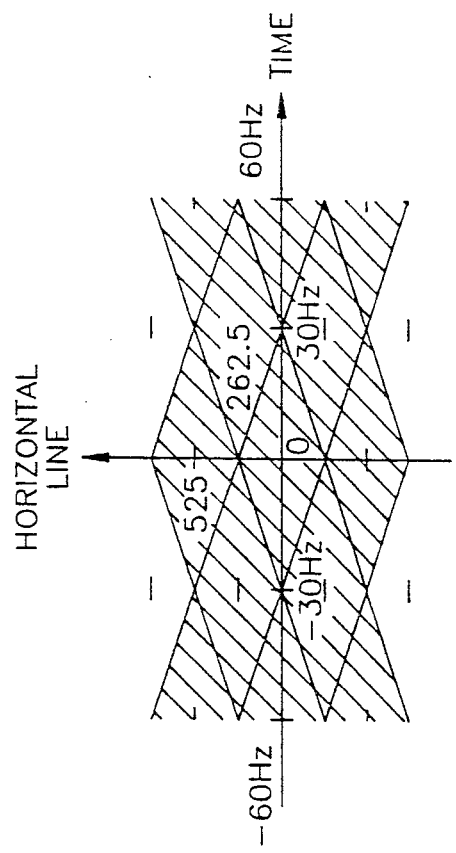
FIGS. 5A and 5B show frequency spectra of a signal after passing the filter in FIG. 2 and FIG. 3.

FIG. 5A shows an example of a frequency spectrum output from the pre-filter and the post-filter.

Figure 5B:
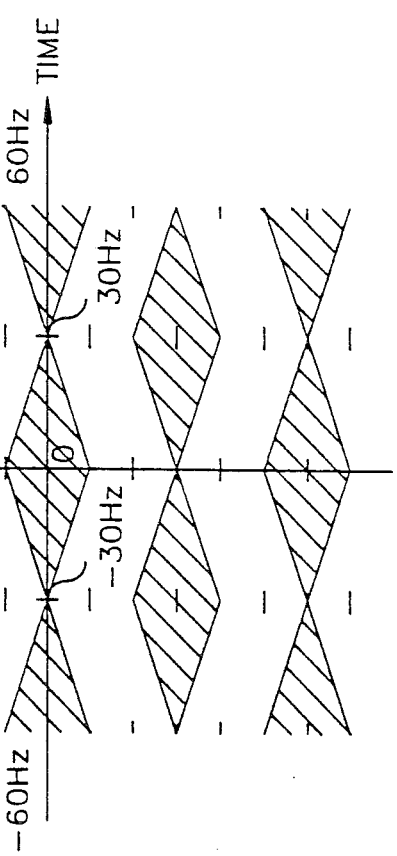

FIG. 5B shows an example of a frequency spectrum output from the scanning converter.

FIG. 6 shows an output of the signal reconstructor (24) which composes one frame into six fields and outputs them during encoding according to the invention.

Referring to the encoding procedure according to the invention, the camera (11) generates the first display signal having 1575 horizontal lines, 2:1 interlaced scanning, and 4:3 aspect ratio. Here, the HDTV signal has 1080 horizontal lines, 2:1 interlaced scanning, and 16:9 aspect ratio and will be referred to as the second display signal. Therefore, the first display signal generated by the camera (11) must be able to satisfy the conditions of the first, second, and third display signal. The first display signal outputted by the camera (11) is R,G,B signal which is converted to Y,I,Q signal by matrix unit (12).

The Y,I,Q signal output from the matrix unit (12) is a first display signal and aliasing of the first display signal is prevented by filtering the signal with pre-filter (13). That is, the output of the pre-filter (13) is applied to the first scanning converter (14) where the first display signal is converted to the third display signal, and the function of preventing aliasing is performed here. Describing the procedure in more detail, the reference spectrum of the first display spectrum lies between $-1575/2$ horizontal line and $+1575/2$ horizontal line with its center spectrum located on (0,0), $(0,+1575),(0,-1575)$ coordinate.

When the first display signal is passed through the prefilter (13), it has the frequency spectrum shown in FIG. 5A and the output of the pre-filter (13) is scan converted from 1575 horizontal lines to 525 horizontal scanning lines having the spectrum shown in FIG. 5B. Therefore, the reference spectrum lies between $-525/2$ horizontal line and $+525/2$ horizontal line, and its center spectrum also moves to coordinate (0,0), $(0,+525)$, $(0,-525)$. Therefore, without pre-filtering process (13), aliasing occurs while converting the first display signal to the second display signal. The spatial direction component of the third display signal output from the first scanning converter is converted to low band, and its temporal direction component is in high band state with NTSC broadcast signal form having 525 horizontal lines, 2:1 interlaced scanning, and 4:3 aspect ratio. This signal is encoded to NTSC broadcasting signal by the first encoder (NTSC encoder) (15) and then is modulated by the first RF modulator (16) and transmitted via channel "I".

Referring to the generating procedure of the HDTV broadcast signal, the first display signal output from the matrix unit (12) is in given unit delayed by the delay unit (17) for compensating the time delay of converting the third display signal output from the first scanning converter (14) to second display signal and filtering.. time delay. The first display signal output from the delay unit (17) is converted to the second display signal by the first line rejecter (18) which rejects a number of top and bottom horizontal lines from 1575 horizontal lines of the first display signal. That is, the first display signal has 1575 horizontal lines and 4:3 aspect ratio while the second display signal has 1080 horizontal lines and 16:9 aspect ratio. Therefore, out of 1575 horizontal lines, the first line rejecter (18) rejects top 248 horizontal lines and bottom 247 horizontal lines. Then, the first display signal becomes the second display signal having 1080 horizontal lines and 16:9 aspect ratio. Here, the second display signal output from the first line rejecter (18) is the broadcast signal to be displayed on the HDTV receiver. And the third display signal output from the first scanning converter (14) is converted to the first display signal by the second scan converter (19), and the first display signal is in a state where the spatial direction component is converted to low band. The output of the second scanning converter (19) is then passed through the post-filter (20) and converted to the second display signal like the first line rejecter (18), and the second display signal is in a state where the spatial direction component is low band. The subtractor (22) subtracts the second display signal output by the second line rejecter (21) from the second display signal output by the first line rejecter (18).

When the second display signal is passed through the subtractor (22), it is in a state where the low band of the spatial direction component is removed. That is, only the high band signal remains in the spatial direction component of the second display signal. The output of the subtractor (22) is applied to the first frequency shifter (23) which moves the second display signal to the direction of original point, 8.4 MHz for luminance signal and 1 MHz for the chrominance signal.

Each frame of the second display signal output from the first frequency shifter (23) is reconstructed into six fields by the first signal reconstructor (24) as shown in FIG. 6. That is, one frame of second display signal consists of; a first field composed of 3n-2th (n=1,2,3 ...) pixels of odd horizontal lines as shown in FIG. 6A; a second field composed of 3n-2th (n=1,2,3 ...) horizontal lines as shown in FIG. 6B; a third field composed of 3n-1th (n=1,2,3 ...) pixels of the odd horizontal lines as shown in FIG. 6C; a fourth field composed of 3n-1th (n=1,2,3 ...) pixels of even horizontal lines as shown in FIG. 6D; a fifth field composed of 3nth pixels of odd horizontal lines; and a sixth field composed of 3nth (n=1,2,3 ...) pixels of even horizontal lines. Therefore, the first signal reconstructor (24) reconstructs one frame signal into six field signals and the temporal direction component becomes "low" band. The second display signal converted to "high" spatial direction components and "low" temporal direction components is applied to the second NTSC encoder (25) where it is encoded to NTSC broadcast signal format, and then it is modulated to RF signal by the second RF modulator (26) and transmitted via channel 1I.

The outputs of the encoders shown in FIG. 2 are a third display signal (NTSC broadcasting signal) having "low" spatial direction component, "high" temporal direction component, 525 horizontal lines, 2:1 interlaced scanning, and 4:3 aspect ratio output to channel "I", and a second display signal (HDTV broadcasting signal) having "high" spatial direction component, "low" temporal direction component, 1080 horizontal lines, 2:1 interlaced scanning, and 16:9 aspect ratio.

When the third display signal transmitted via channel "I", is applied to a NTSC receiver, the broadcasting signal can be viewed directly. However, when the signal is applied to a HDTV receiver, it is restored to its original HDTV display signal by composition shown in FIG. 3; and its procedure is as follows; the second display signal transmitted via channel "II" is first demodulated by the second RF demodulator (36), then it is decoded by the second NTSC decoder (37) and is converted to the second display signal output by the first signal reconstructor. Here, since the second display signal has "low" temporal direction component and "high" spatial direction component, the temporal direction component is compensated by the second signal reconstructor (38). Here, the second signal reconstructor (38) converts one frame of the second display signal into 2 field signals in which the first, third, and fifth field signals compose odd signal, and second, fourth and sixth field signals compose even signal. The second signal reconstructor (38) compensates the temporal direction component of the second display signal, and outputs this signal to the second frequency shifter (39), and the second frequency shifter (39) restores the original frequency by moving the signal 8.4 MHz for luminance signal and 1 MHz for the chrominance signal in the opposite direction of that performed by the first frequency shifter (23). And the third display signal transmitted via channel "I" is demodulated by the first RF demodulator (31), and then decoded by the first decoder (32) and is converted to the signal output by the first scanning converter (14). Then, in order to convert the third display signal to second display signal, the first scanning converter (14) converts the third display signal to first display signal having 1575 horizontal lines, 2:1 interlaced scanning, and 4:3 aspect ratio, and aliasing is prevented by filtering the signal with the post-filter (34). The converted frequency spectrum of the signal is shown in FIG. 5A. Then, the third line rejecter (35) rejects top 248 lines and bottom 247 lines from 1575 horizontal lines of the first display signal to convert the signal to the second display signal. When top and bottom horizontal lines are rejected as described above by the third line rejecter (35), the signal is converted to a second display signal having 1080 horizontal lines, 2:1 interlaced scanning, and 16:9 aspect ratio with the display signal in a state where spatial direction component is low band. The second display signal output from the second frequency shifter (39) and the second display signal output from the second line rejecter (35) are added by the adder (40) where the "low" band of the spatial direction component of the second display signal is compensated to restore the signal back to its original HDTV second display signal. Then, the second display signal output from the adder (40) is converted to R,G,B signal by the dematrix unit (41), and is displayed on the display unit (42) having 1080 horizontal lines, 2:1 interlaced scanning, and 16:9 aspect ratio.

In summary, the NTSC format has the composition of 525 horizontal lines, 2:1 interlaced scanning, and 4:3 aspect ratio, and the HDTV format has the composition of 1080 horizontal lines, 2:1 interlaced scanning, and 16:9 aspect ratio.

Therefore, first in the present invention, in step IA, through the camera (11) an input image signal is scanned as the first display signal having 1575 horizontal lines, 2:1 interlaced scanning, 4:3 aspect ratio as shown in FIG. 4. Then, using the first display signal, a third display signal in NTSC format is generated in step IB and 525 horizontal lines which is ⅓ of 1575 horizontal lines, are selected and transmitted via channel "I", and a second display signal in HDTV format is generated in step "1C" and a number of top and bottom horizontal lines from the 1575 horizontal lines of the first display signal are rejected and transmitted via channel "II" in a form of a signal with 1080 horizontal lines, 2:1 interlaces scanning, and 16:9 aspect ratio. Here, since 1575 lines of the third display signal are is converted interlaced scanning to 525 lines, the spatial direction components are converted to low frequency band and the temporal direction components are in high frequency band. And in the second display signal, the low frequency band of the spatial direction component is suppressed and the high frequency band of the spatial direction component is extracted, and the composition of a frame is reconstructed into six fields to convert the temporal direction component to low frequency band and spatial direction component to the high frequency band.

The third display signal transmitted via channel "I" is displayed in a third signal state by step ID when using a NTSC receiver. However, when using a HDTV receiver, the third display signal is received in step 1E, and after being converted to a first display signal having 1575 horizontal lines, 2:1 interlaced scanning, and 4:3 aspect ratio in step IF, the converted signal is converted to a second display signal having 1080 horizontal lines, 2:1 interlace scanning again, and 4:3 aspect ratio by rejecting top and bottom horizontal lines of the first display signal in step IG. Here, the second display signal is in a state where the temporal direction component is high and spatial direction component is low. And the temporal direction component of the second display signal transmitted via channel "II" is compensated by reconstructing a frame signal composed of six fields to two fields. And in step II, the second display signals generated in the step IH and step IG are added to compensate the low band spatial component of the temporal direction component compensated second display signal, thus generating the desired second display signal in HDTV format. Then, in step IJ, the spatial direction component and temporal direction component compensated second display signal is displayed on a HDTV receiver.

As described in the foregoing, the present invention can accommodate both HDTV and NTSC receivers simultaneously to provide compatibility, and since top and bottom horizontal lines of a display signal is rejected when generating HDTV display signal, compared to complex processing method of the side panel method or unharmonizing display signal of the letter box method, according to the present invention, transmitting and restoring the signal of HDTV format completely is possible.

While the invention has been particularly shown and described with reference to a preferred embodiment, it will be understood by those skilled in the art that modifications in detail may be made without departing from the spirit and scope of the invention.

What is claimed is:

1. A method for providing compatibility between NTSC television which receives a third display signal transmitted via channel "I" and HD television which receives a second display signal transmitted via channel "II", said method comprising the steps of:
    generating a first display signal;
    generating a third display signal with a high frequency band of time direction components and a low frequency band of spatial direction components by converting said first display signal, and transmitting said third display signal via channel "I" after encoding said third display signal in NTSC television format;
    generating a second display signal with a low frequency band of time direction components and a high frequency band of spatial direction components by rejecting a number of top and bottom horizontal lines of said first display signal, and transmitting said second display signal via channel "II";
    converting said third display signal transmitted via said channel "I" to said first display signal;
    converting said first display signal to said second display signal by rejecting a number of horizontal lines of said first display signal; and
    receiving the second display signal transmitted via channel "II" and compensating spatial direction components by adding time direction components compensated second display signal with the second display signal wherein said spatial direction components are low band.

2. The method for providing compatibility between NTSC television and HD television as claimed in claim 1, wherein said first display signal has 1575 horizontal lines, 2:1 interlaced scanning, and 4:3 aspect ratio.

3. The method for providing compatibility between NTSC television and HD television as claimed in claim 2, wherein transmission of said third display signal is performed by generating a third display signal having 525 horizontal lines, 2:1 interlaced scanning, and 4:3 aspect ratio with low frequency band of spatial direction component by selecting 525 horizontal lines which is ⅓ of 1575 horizontal lines of said first display signal, and then transmitting the signal via channel "I" after encoding the third display signal in NTSC format.

4. The method for providing compatibility between NTSC television and HD television as claimed in claim 3, wherein said step of generating said second display signal further comprises the steps of:
    (a) generating a second display signal having 1080 horizontal lines, 2:1 interlaced scanning, and 16:9 aspect ratio by rejecting a given number of top and bottom horizontal lines of said first display signal;
    (b) converting scanning lines from said third display signal to a first display signal having 1575 horizontal lines, 2:1 interlaced scanning, and 4:3 aspect ratio;
    (c) generating a second display signal having 1080 horizontal lines, 2:1 interlaced scanning, and 16:9 aspect ratio by rejecting a number of top and bottom horizontal lines of said first display signal generated in said step (b);
    (d) generating a second display signal having a high frequency band of spatial direction components by subtracting said second display signal generated in step (c) from said second display signal generated in step (a);
    (e) reconstructing said second display signal generated in step (d) to six fields per frame for converting time direction components to low band; and
    (f) encoding said second display signal received from said step (e) having a high frequency band of spatial direction components and a low frequency band of temporal direction components, and transmitting said second display signal via channel "II".

5. An encoding device for generating NTSC television and HD television broadcast signal using two channels, comprising;
    means for generating a first display signal;
    pre-filter means for preventing aliasing by filtering said first display signal;
    first scanning converter means for converting the output of said pre-filter means to a third display signal having low spatial direction components of a NTSC broadcast signal;

first NTSC encoder means for encoding the output of said first scanning converter means;

first RF modulator means for modulating the output of said first NTSC encoder means to provide a modulated signal, and for transmitting said modulated signal via channel "I";

delay means for delaying said first display signal;

first line rejecter means for converting the first display signal from said delay means into a second display signal by rejecting a number of top and bottom horizontal lines from the first display signal;

second scanning converter means for converting the third display signal of said first scanning converter means into a first display signal having a low frequency band of spatial direction component;

first post-filter means for preventing aliasing by filtering the first display signal of said second scanning converter means;

second line rejecter for converting the output of said first post-filter means into a second display signal in HD television format by rejecting a number of top and bottom horizontal lines from the first display signal;

subtractor means for providing a high frequency band of spatial direction component of the second display signal by subtracting the output of said second line rejecter means from the second display signal of said first line rejecter means;

first frequency shifter means for shifting the second display signal of said subtractor means toward an initial direction;

signal reconstruction means for reconstructing the output of said first frequency shifter means into multiple fields and generates a second display signal having a low frequency band of temporal direction component;

second NTSC encoder for encoding the output of said signal reconstruction means to a NTSC broadcast signal; and second RF modulator means for modulating the output of said second NTSC encoder means to provide a modulated signal, and for transmitting said modulated signal via channel "II".

6. The encoding device which generates NTSC and HD television broadcast signal as claimed in claim 5, wherein:

said first display signal has 1575 horizontal scanning lines, 2:1 interlaced scanning ratio, and 4:3 aspect ratio;

said second display signal has 1080 horizontal scanning lines, 2:1 interlaced scanning ratio, and 16:9 aspect ratio; and said third display signal has 525 horizontal scanning lines, 2:1 interlaced scanning ratio, and 4:3 aspect ratio.

7. A HDTV decoding device for restoring HD television format signal using the third display signal transmitted via channel "I" in which the spatial direction component is low frequency band and the temporal direction component is high frequency band, and the second display signal transmitted via channel "II" in which the spatial direction component is high band, frequency is shifted into initial direction, and temporal direction component is high frequency band composed of a plurality of fields, comprising:

first RE demodulator means for modulating said third display signal in RF format transmitted via channel "I";

first NTSC decoder means for decoding the output of said first demodulator means in NTSC format;

third scanning converter means for converting the output of said first NTSC decoder means into a first display signal;

second post-filter means for eliminating aliasing by filtering the output of said third scanning converter means;

third line rejecter means for converting the first display signal from said second post-filter means into a second display signal by rejecting a number of top and bottom horizontal lines from the first display signal;

second RF demodulator for demodulating the second display signal in RF format transmitted via channel "II";

second NTSC decoder means for decoding the output of said second RF demodulator means in NTSC format;

second signal reconstruction means for reconstructing the multiple field signal of second display signal of said second decoder to compensate the temporal direction component of the second display signal back to an original frame signal;

second frequency shifter means for shifting the frequency of second display signal outputted by said second signal reconstruction means back to an original frequency;

adder means for compensating the low frequency band of said second display signal by adding the second display signals from said second line rejecter means and said second frequency shifter means;

dematrix means for converting the output from said adder means into R, G, B signals; and display means for displaying said R, G, B signals.

8. The HDTV decoding device as claimed in claim 7, wherein:

said third display signal has 575 horizontal scanning lines, 2:1 interlaced scanning ratio, and 4:3 aspect ratio;

said second display signal has 1080 horizontal scanning lines, 2:1 interlaced scanning ratio, and 16:9 aspect ratio; and said first display signal has 1575 horizontal scanning lines, 2:1 interlaced scanning ratio, and 4:3 aspect ratio.

* * * * *

UNITED STATES PATENT AND TRADEMARK OFFICE
CERTIFICATE OF CORRECTION

Page 1 of 2

PATENT NO. : 5,136,380
DATED : 4 August, 1992
INVENTOR(S) : Hyeon-Deok Cho

It is certified that error appears in the above-indentified patent and that said Letters Patent is hereby corrected as shown below:

Column 2,

Line 49    after "and", change "4:3" to --16:9--;

Column 3

Line 26    before "A", change "reconstructor" to --reconstruction--;

Line 26    before "(24)", change "reconstructior" to -- reconstructor--;

Column 5

Line 29    before "a", delete ";" and replace with --:--

Line 47    after "channel", change "1I" to --II--;

Line 62    after "follows", change ";" to --:--;

UNITED STATES PATENT AND TRADEMARK OFFICE
CERTIFICATE OF CORRECTION

PATENT NO. : 5,136,380

DATED : August 4, 1992

INVENTOR(S) : Hyeon-Deok Cho

It is certified that error appears in the above-indentified patent and that said Letters Patent is hereby corrected as shown below:

Column 6, line 66, after "are", delete "is":

Signed and Sealed this

Eighth Day of October, 1996

Attest:

BRUCE LEHMAN

Attesting Officer

Commissioner of Patents and Trademarks